(12) United States Patent  (10) Patent No.: US 8,099,578 B2
Godwin et al.  (45) Date of Patent: Jan. 17, 2012

(54) METHOD AND SYSTEM FOR FINDING SCROLLED REGIONS WITHIN A TILE CACHE

(75) Inventors: Mark R. Godwin, Berkshire (GB); Vivian A. Lloyd, Berkshire (GB)

(73) Assignee: Computer Associates Think, Inc., Islandia, NY (US)

( * ) Notice: Subject to any disclaimer, the term of this patent is extended or adjusted under 35 U.S.C. 154(b) by 655 days.

(21) Appl. No.: 12/109,438

(22) Filed: Apr. 25, 2008

(65) Prior Publication Data

US 2009/0083512 A1    Mar. 26, 2009

Related U.S. Application Data

(60) Provisional application No. 60/974,755, filed on Sep. 24, 2007.

(51) Int. Cl.
*G06F 12/08* (2006.01)

(52) U.S. Cl. .......... 711/173; 711/129; 711/159
(58) Field of Classification Search .......... 711/129, 711/159, 173
See application file for complete search history.

(56) References Cited

U.S. PATENT DOCUMENTS 5,126,999 A * 6/1992 Munter et al. .......... 370/415
7,167,980 B2 * 1/2007 Chiu .......... 713/160

* cited by examiner

*Primary Examiner* — Midys Rojas
(74) *Attorney, Agent, or Firm* — Baker Botts L.L.P.

(57) ABSTRACT

In a method embodiment, a method includes periodically polling data sent to an output. The output is operable to render the data into a human-perceptible form. The method further includes determining if at least one partition of a first plurality of discrete partitions of the perdiodically polled data is substantially identical to a combination of respective portions of at least two partitions of a second plurality of discrete partitions of data recorded within a computer-readable storage.

18 Claims, 3 Drawing Sheets

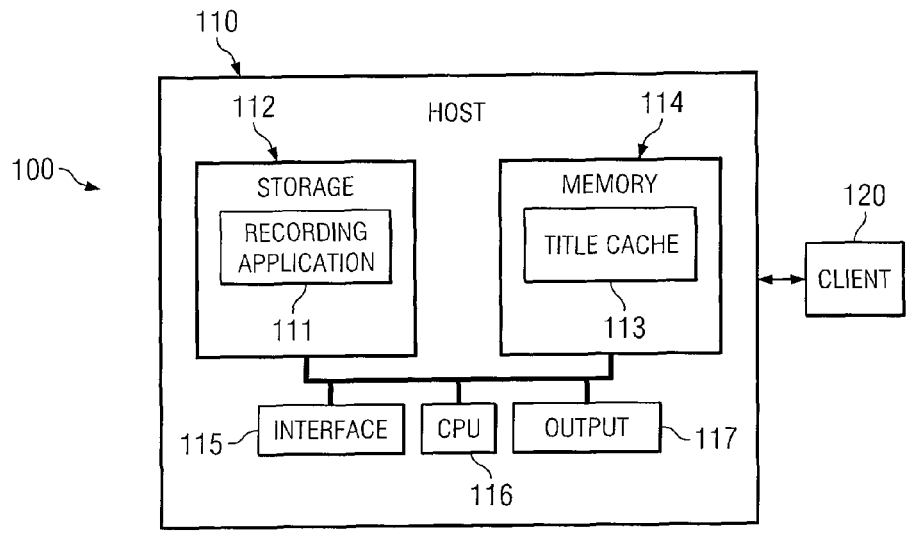
FIG. 1
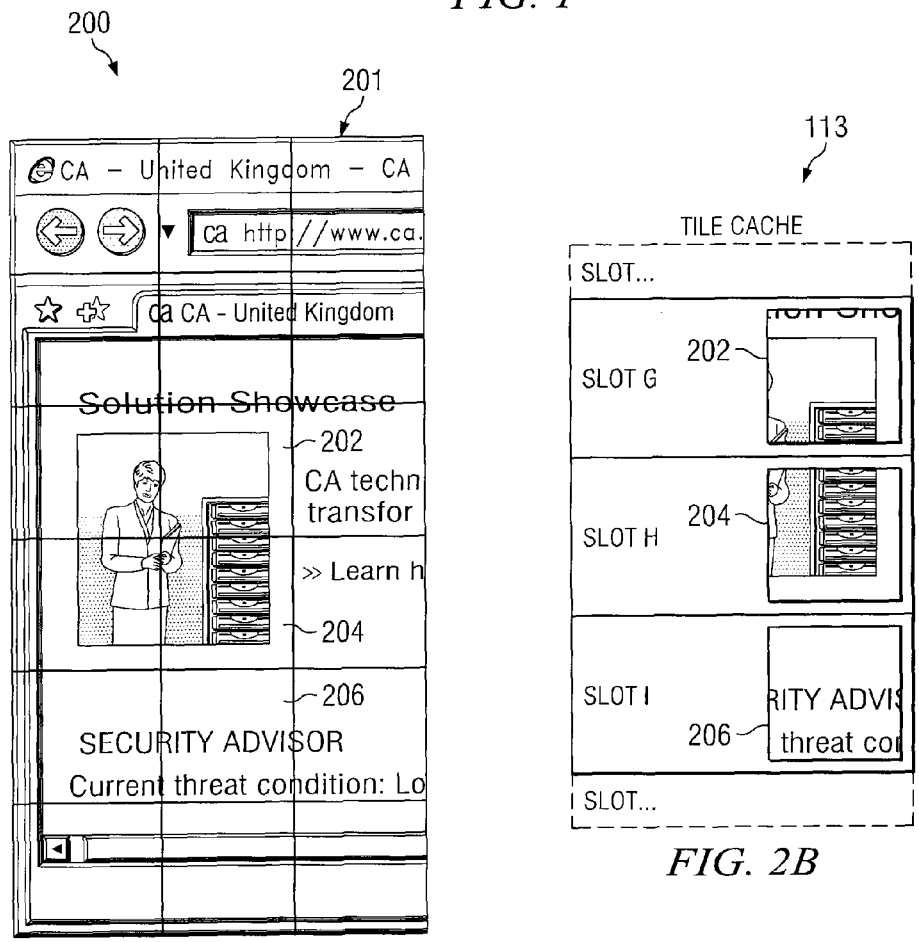
FIG. 2A
FIG. 2B

METHOD AND SYSTEM FOR FINDING SCROLLED REGIONS WITHIN A TILE CACHE

CROSS REFERENCE TO RELATED APPLICATIONS

This application claims the benefit of priority under 35 U.S.C. §119(e) of U.S. Provisional Patent Application Ser. No. 60/974,755 entitled "Methods and Systems for Finding Scrolled Regions within a Tile Cache," which was filed on Sep. 24, 2007 and is incorporated by reference, herein.

TECHNICAL FIELD

This disclosure relates generally to screen recording applications, and more particularly to methods and systems for finding scrolled regions within a tile cache.

BACKGROUND

A variety of computer applications record user activity by storing data captured from a computer screen. Some such applications enable a user on one computer (the "Viewer") to view and control the desktop of another computer (the "Host"). However, some such computer applications are limited for a variety of reasons. For example, some conventional applications use schemes that are dependent on a particular operating system, and/or that are memory and processor intensive.

SUMMARY

This disclosure relates in general to screen recording applications. More specifically, the present disclosure is directed to methods and systems for finding scrolled regions within a tile cache. The teachings of some embodiments of the present disclosure allow a client user to remotely view the display of a host computer and control the host computer accordingly.

In a method embodiment, a method includes periodically polling data sent to an output. The output is operable to render the data into a human-perceptible form. The method further includes determining if at least one partition of a first plurality of discrete partitions of the perdiodically polled data is substantially identical to a combination of respective portions of at least two partitions of a second plurality of discrete partitions of data recorded within a computer-readable storage.

BRIEF DESCRIPTION OF THE DRAWINGS

FIG. 1 is a block diagram of a portion of a remote viewing system that generally includes a host communicatively coupled to at least one client according to one embodiment of the present disclosure;

FIG. 2A illustrates a portion of an example Internet Explorer window displayed by the host of FIG. 1;

FIG. 2B illustrates a portion of the contents of a tile cache that may be used by the system of FIG. 1;

DETAILED DESCRIPTION

Figure 3A:
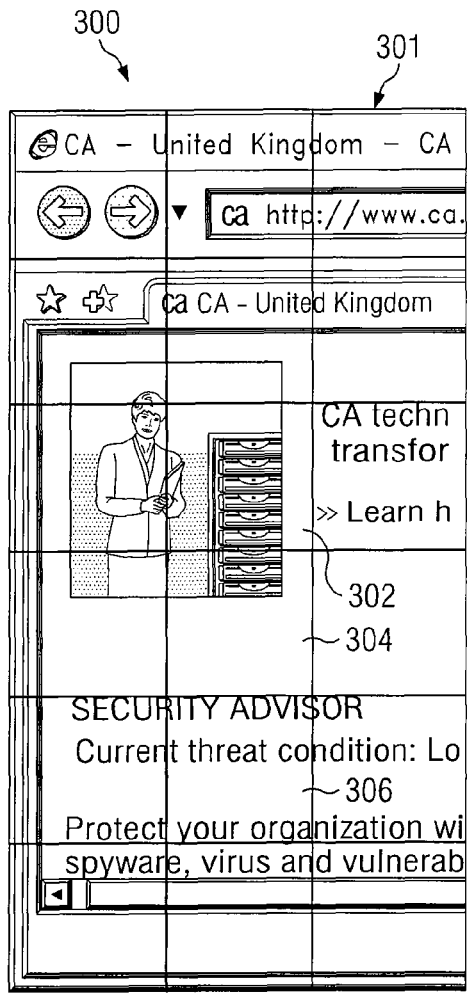
FIG. 3A illustrates a scrolled portion of the example Internet Explorer window of FIG. 2A.

In accordance with the teachings of the present disclosure, methods and systems for finding scrolled image regions within a tile cache are provided. The methods and systems may be used in a variety of applications. Examples of such computer applications include enhanced recording applications and/or enhanced remote control applications. A remote control application typically allows a user on one computer (the "Viewer") to view and control the desktop of another computer (the "Host"). Some recording applications record computer desktop activity and are substantially similar to the Host portion of typical remote control applications. The recorded information may then be used, for example, to playback desktop activity sometime later or to communicate the desktop activity to another computer. Particular examples specified throughout this document are intended for example purposes only, and are not intended to limit the scope of the present disclosure.

FIG. 1 is a block diagram of a portion of a remote viewing system 100 that generally includes a host 110 communicatively coupled to at least one client 120 according to one embodiment of the present disclosure. A recording application 111, residing in storage 112 of host 110, generally finds scrolled regions within a tile cache 113 of memory 114, as explained further below. In some embodiments, recording application 111 may also effect the replication of an output 117 of host 110 to client 120, thereby enabling a user of client 120 to view and control host 110.

Host 110 generally refers to any device operable to find scrolled regions with tile cache 113, as explained further below. For example, host 110 may be a computer, a handheld device, a cell phone, or a server. Host 110 may execute with any of the well-known MS-DOS, PC-DOS, OS-2, MAC-OS, WINDOWS™, UNIX, or other appropriate operating systems, including future operating systems. In this example, host 110 further includes an interface 115 and a central processing unit (CPU) 116. Output 117 of host 110 generally refers to any device capable of receiving input and rendering the input to the physical senses of a user. For example, output 117 may be a computer screen, a projected display, or any combination of the proceeding.

Tile cache 113 generally refers to any suitable device capable of storing computer-readable data and instructions. Tile cache 113 may include, for example, logic in the form of software applications, computer memory (e.g., Random Access Memory (RAM) or Read Only Memory (ROM)), mass storage medium (e.g., a magnetic drive, a disk drive, or optical disk), removable storage medium (e.g., a Compact Disk (CD), a Digital Video Disk (DVD), or flash memory), a database and/or network storage (e.g., a server), other computer-readable medium, or a combination and/or multiples of any of the preceding. In this example, tile cache 113 includes cache memory capable of storing copies of the input data received by output 117. The copies are partitioned and stored within tile cache 113 as data tiles, as detailed further below.

Client 120 generally refers to any device operable to communicate with host 110. For example, client 120 may be a second computer workstation, a server, a handheld computer, and/or a cellular telephone. The communication between client 120 and host 110 may be effected using any suitable technology, such as, for example, the Internet, radio frequency, Bluetooth™, wired connections, or any combination of the preceding.

Although FIG. 1 illustrates recording application 111 residing within storage 112 of host 110, recording application 111 may reside in any suitable location. For example, all or a portion of recording application 111 may alternatively or additionally reside within memory 114 or client 120. In addition, all or a portion of recording application 111 may reside in removable computer readable media, such as, for example, within an encoded compact disc (CD). Tile cache 113 may likewise reside in any suitable location. For example, in alternative embodiments, tile cache 113 may reside within storage 112.

In operation, recording application 111 determines which areas of the output 117 have changed, and collects images of these changed areas. For example, recording application 111 may periodically capture images from output 117, one section or "tile" at a time. The recording application 111 determines, by comparison with a local copy, which section(s) or tile(s) have changed since the last poll. Recording application 111 may then examine tile cache 113 to determine whether or not, and to what extent, any portion of the presently captured tiles are spatially translated, or "scrolled," with respect to the tiles previously recorded within tile cache 113. In this manner, if a user scrolls a viewing window of a computer screen, recording application 111 may efficiently represent the scrolling operation in the recording data stream with a number of referencing commands directed to previously recorded data, which may result in significant bandwidth savings. In other words, instead of recording images of the changed screen area in the data stream every polling cycle, recording application 111 may first determine whether the presently acquired data significantly matches previously recorded data and proceed accordingly.

Some embodiments of the present disclosure are highly flexible and adaptable. For example, the use of output 117 data, as opposed to data internal to a specific operating system, facilitates the execution of recording application 111 across any of a variety of operating systems and platforms. Additional detail of the operation of recording application 111 is explained below with reference to FIGS. 2A through 5.

FIG. 2A illustrates a portion of an example Internet Explorer window 200 displayed by output 117 of FIG. 1 according to one embodiment of the present disclosure. In this example, recording application 111 periodically records, one section at a time, display data visible on output 117. More specifically, the illustrated portion of window 200 includes a 3×6 array of equal-sized, square tiles (e.g., tiles 202, 204, and 206) individually cached by recording application 111 as bitmaps within tile cache 113; however, recording application 111 may record data communicated to output 117 in any suitable data format using partitions or tiles having any suitable shape(s) (e.g., rectangular, triangular, etc.), dimension(s), and/or size(s). In some embodiments, recording application 111 may also communicate the recorded data to client 120, thereby enabling a user of client 120 to view and control host 110.

FIG. 2B illustrates a portion of the contents of the tile cache 113 of FIG. 1 corresponding to window 200 of FIG. 2A. The illustrated portion of tile cache 113 includes only a small subset of the total tile cache 113 contents. In particular, three slots G, H, and I contain bitmaps corresponding to tiles 202, 204, and 206 respectively, of FIG. 2A.

Recording application 111 will periodically collect tiles of screen data representing changes made to the screen. For example, recording application 111 may compare current data communicated to output 117 with the content of a local memory copy of the last known screen image. The recording application 111 searches the tile cache 111 for identical cached tiles, for example, by means of a hash table keyed by a checksum of the tile image.

If a match is found, the corresponding slot (e.g., slots G, H, and I) of tile cache 113 remains unchanged. A reference to a previously sent tile may then be appended to the recording data stream. Such a reference may include, for example, an identifier of a previously cached tile, or an index of the cached tile within the tile cache; however, any suitable identifier of the tile image previously received and recorded by client 120 may be used (e.g., a grid location of the tile within a aggregate image of cached tiles, etc.). Some embodiments that send a reference in this manner as opposed to the entire tile may result in an almost 100% saving in data size for tile cache 113 hits.

If no match is found, recording application 111 determines whether or not the discrepancy was due to a window scroll, or any other operation involving spatial translation of screen data. One example of a vertical window scroll is described further below with reference to FIG. 3A.

FIG. 3A illustrates a scrolled portion 300 of the example Internet Explorer window 200 of FIG. 2A. That is, window 300 of FIG. 3A is scrolled down slightly with respect to window 200 of FIG. 2A, such that an upper portion of the viewing page of window 200 is no longer visible in window 300. Conversely, a bottom portion of the viewing page of window 300, which was not previously visible in window 200, is now visible. In this example, some of the current tiles of window 300 match the previously recorded tiles of window 200. For example, the previously recorded tile 201 of window 200 matches the present tile 301 of window 300. Most of the tiles of window 300, however, do not match corresponding tiles of window 200. For example, tiles 302, 304, and 306 of window 300 do not match corresponding tiles 202, 204, and 206, respectively, which are stored in slots G, H, and I of tile cache 113, respectively. Nevertheless, the majority of window 300 contains the same image data as the preceding window 200, though slightly offset, or spatially translated, in a vertical direction. Although this example uses vertical scrolling, the teachings of the present disclosure likewise apply to any other suitable scrolling direction, including, for example, horizontal and/or diagonal scrolling.

Despite the fact that the stored tiles in tile cache 113 do not align correctly with the new tiles read from output 117, much of the image data of window 300 is present in tile cache 113, as sub-images of the cached tiles. This sub-image concept is illustrated further with respect to FIG. 3B.

Figure 3B:
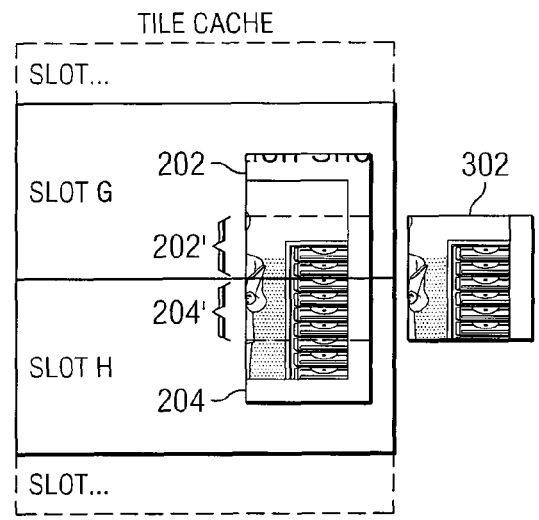
FIG. 3B illustrates a portion of the contents of the tile cache of FIG. 2B that includes data corresponding to the scrolled portion of FIG. 3A.

FIG. 3B illustrates a portion of the contents of tile cache 113 illustrated in FIG. 2B that include the scrolled region corresponding to tile 302 of window 300. More specifically, for a vertical scroll, the new tile 302 can be represented by sub-images 202' and 204' of exactly two tiles 202 and 204 cached respectively in slots G and H of tile cache 113. In addition, for a vertical scroll, the sub-images required to make up the new tile image typically include a sub-image aligned with the bottom of one cached tile, and a sub-image aligned with the top of another cached tile.

Although the appropriate information may be available in tile cache 113, it is a non-trivial operation to locate the sub-images that exactly constitute a specific tile image from a tile cache containing tens of thousands of tiles, and megabytes of image data. More specifically, for an n-by-n square tile, there are $((n(n+1))/2)^2$ different sub-images of a single tile. That equates to 278,784 sub-images for a 32*32 tile. Even if an exhaustive search of the tiles was performed, a considerably worse combinatorial explosion could be encountered when trying to reconcile which sub-images combine to optimally make up the complete tile. In addition, some applications may frequently trigger a change to the output 117, and therefore new screen tiles may be collected by the recording application 111 hundreds of times a second.

In general, to determine whether a group of tile mismatches are due to a vertical scroll, recording application 111 searches through tile cache 113 for vertically offset sub-images. Considering only sub-image matches that are no greater than the tile, tile cache 113 contains (n(n+1)/2) possible sub-images to match against. For a 32*32 pixel tile, this equates to 528 sub-images. However, as shown previously, the matches against any sub-tile for a vertical scroll operation will typically align with the top of one tile and the bottom of another tile. This restricts the search of tile cache 113 to (n*2−1) combinations of sub-tiles, equating to just 63 sub-images for a 32*32 tile, as illustrated in FIG. 4.

Figure 4:
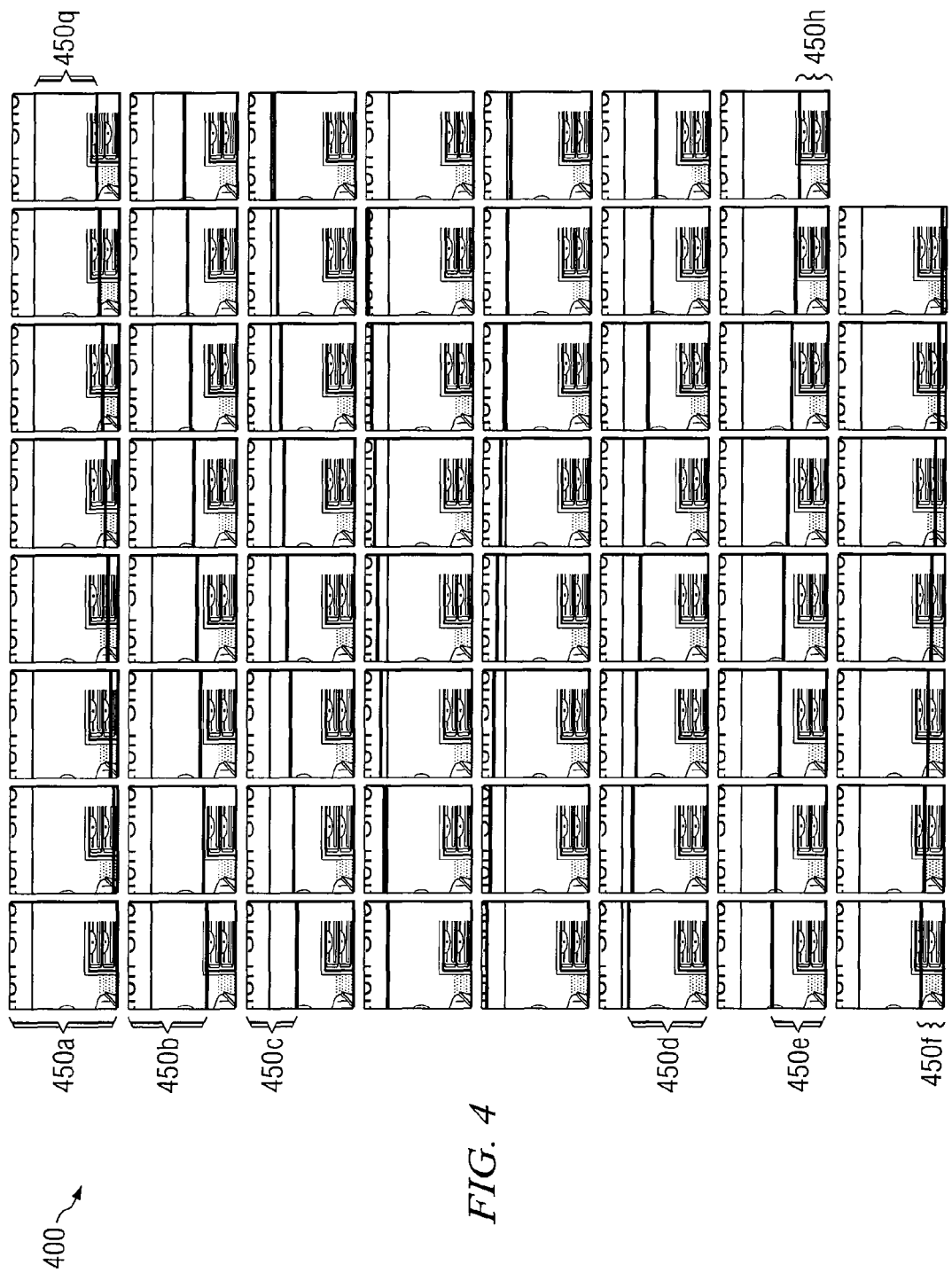
FIG. 4 is an example collection of tiles illustrating the possible sub-image matches corresponding to the scrolled portion of FIG. 3A.

FIG. 4 is an example collection of tiles 400 illustrating the possible sub-image matches (63 in total) corresponding to a vertical scroll for the 32*32 pixel tile 202 of FIG. 2A. The illustrated braces 450 highlight corresponding sub-image areas for respective tiles that could be matched. The use of square tiles having equal dimensions of 32*32 pixels is for example purposes only and not intended to limit the scope of the present disclosure. As mentioned previously, recording application 111 may record data communicated to output 117 in any suitable data format using sections having any suitable shape(s), dimension(s), and/or size(s). For example, some embodiments may capture data from output 117 using a variety of different tile sizes. To illustrate, some embodiments may use larger tile sizes (e.g., 64*64 pixels or 128*128 pixels) near the extremity of a viewing screen where changes are less likely to occur. In addition, some embodiments may use rectangular tiles, and/or tiles having dimensions significantly smaller than 32*32 pixels (e.g., 16*32 pixels or 8*8 pixels). Other embodiments may use a combination of tile shapes, such as, for example, rectangular and square tiles.

For each (n-by-n) tile stored in tile cache 113, (n*2−1) references to that cached tile are inserted into a hash table. Each inserted reference represents a different searchable sub-image area, keyed on the checksum of the sub-image. A number of hash tables may be used to minimize hash collisions. Some embodiments may maintain a separate hash table for each distinct sub-image area of the tiles. Although some embodiments may not increase the number of hash tables, doing so may reduce hash collisions during lookups, while only marginally increasing memory usage.

Each sub-tile hash table entry references the same cached tile, so the total additional size of the modified tile cache 113 data structures is limited to the size of these extra hash table entries. This is roughly comparable to the size of the original tile data itself. Thus, the memory impact of the modified tile cache 113 is in the approximate order of doubling in footprint. The CPU 116 overhead of inserting the extra hash table entries is low, because hash table insertions can be performed in near-constant time. Dynamic allocation overheads may be reduced or eliminated by pre-allocating the hash bucket links with each tile.

The example embodiment uses a checksum algorithm that reduces the CPU 116 impact of calculating the (n*2−2) additional checksums to almost negligible levels. More specifically, this example uses a checksum calculation for an image which is the sum of the CRC-32 of each scan-line in the image. Due to the nature of the summation operation, this checksum can be calculated in any scan-line order to produce the same result, and also trivially reversed to produce the checksum of a smaller sub image from that of a larger image. However, any algorithm that allows out-of-order incremental calculation may be used.

By using the example CRC-32-based checksum algorithm described above, once the CRC-32 of each scan-line has been calculated, checksums may be quickly produced for all of the sub-images of the tiles inserted. The following example pseudo-code may be used to generate a checksum for each sub-image of interest in a tile:

```
Uint32 LineChecksum[ TileHeight ]
Uint32 SubImageChecksum[ TileHeight * 2 − 1 ]
Uint32 RunningChecksum = 0
For a = 0 to TileHeight
   LineChecksum[a] = CRC32
RunningChecksum += LineChecksum[a]
SubImageChecksum[a] = RunningChecksum
For a = 0 to TileHeight − 1
   RunningChecksum −= LineChecksum[a]
   SubImageChecksum[ TileHeight − 1 + a ] =
   RunningChecksum
```

In this example, TileHeight is the height of a screen tile. LineChecksum is an array, used to store the CRC-32 for each scan line in the image. SubImageChecksum is an array, used to store the calculated sub-image checksums. CRC32( ) is a function that calculates the CRC-32 of a given block of data. The pseudo code and explanations above are for example purposes only and not intended to limit the scope of the present disclosure.

In this example, the above checksum calculations are performed once for each image tile read from output 117. The results of the tile checksum calculations performed when searching tile cache 113 can be re-used if no suitable cached tiles were found. An example method for locating a match for a new display tile within tile cache 113 is explained further below with reference to FIG. 5.

Figure 5:
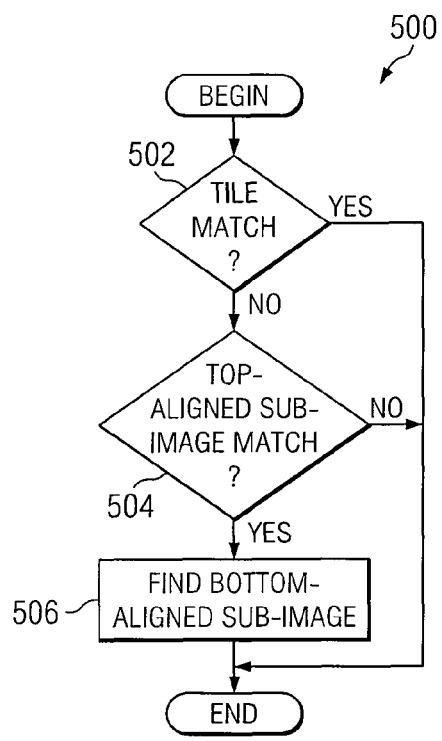
FIG. 5 is a flow chart illustrating example steps that may be performed by the system of FIG. 1 to locate tile matches within the possible sub-image matches of FIG. 4.

FIG. 5 is a flow chart 500 illustrating example steps that may be performed by the system of FIG. 1 to locate tile matches within the possible sub-image matches of FIG. 4. In this example, recording application searches tile cache 113 for one or more matches due to a vertical scroll using three general steps 502, 504, and 506.

In step 502, the checksum of the entire source tile is calculated, and the "full-tile" hash table is searched for that checksum. If any cached tiles with a matching checksum are found, a memory comparison is performed between the source tile and cached tile, to discard any false-positives from checksum collisions. If an exact match is found the cache lookup has completed successfully. The source tile data is discarded, and replaced by a reference to the previously cached tile. Such a reference may include, for example, an identifier of a previously cached tile, or an index of the cached tile within the tile cache; however, any suitable identifier of the tile image previously received and recorded by client 120 may be used (e.g., a grid location of the tile within a aggregate image of cached tiles, etc.). The cache lookup is now complete, and steps 504 and 506 are skipped. The above operations of step 502 are performed on every tile read from output 117.

If no match was found during step 502, the second phase of the cache searching commences in step 504. The checksum of the largest top-aligned sub-image of the tile is calculated, and the appropriate hash table is searched to find a match with the same sized sub-image from the bottom-aligned sub images of the cached tiles. As with the full tile cache search, memory comparison is used to verify that sub-images with matching checksums are identical. This process is repeated with continually decreasing sized top-aligned sub-images, as illustrated in FIG. 4, until a match is discovered. The method then moves onto step 506. If no match is discovered in step 504, (i.e., even a 1-pixel high match was not discovered in tile cache 113), the search for a vertically offset match in tile cache 113 has failed, and flowchart 500 comes to an end.

In step 506, the remaining un-matched bottom-aligned sub-images of the source tile are processed. For example, if a 23 pixel high top-aligned sub-image of a 32 pixel high bitmap is found in step 504, step 506 would begin with a 9 pixel high bottom aligned sub-image. The appropriate hash table is searched to find a match with the same sized sub-image from the top-aligned sub-images of the cached tiles. Again, memory comparison is used to discard false-positives from the checksum comparison. This is repeated for progressively increasing sizes of bottom-aligned sub-image of the source tile. This repetitive increase in sub-tile size results in an area of overlap between the top and bottom sub-images of the source tile. This overlap may be tested to avoid missing potential matches if the top part of the sub-image is present in more than one cache tile. Step 506 may continue until either a match to a sub-image has been found, or the largest possible sub-image has been tested.

If a matching sub-image is found in step 506, the cache search for the source tile has been successful. The source tile data is discarded, and replaced by references to the two sub-images of the cached tiles that were discovered in steps 504 and 506. Such references may include, for example, an identifier of a previously cached tile, or an index of the cached tile within the tile cache; however, any suitable identifier of the tile image previously received and recorded by client 120 may be used (e.g., a grid location of the tile within a aggregate image of cached tiles, etc.).

However, if a matching sub-image is not found in step 506, the source tile is added to tile cache 113, using the example procedure described earlier. This example inserts the full source tile image into tile cache 113, thereby making the tile available for matching against subsequent tiles. In some embodiments, the entire source tile bitmap is then sent to client 120.

Some embodiments may include additional optimization techniques, which may reduce bandwidth requirements when only a partial source tile match is present in the tile cache. For example, if a sub-tile match is found in step 504, the un-matched bitmap data of the source tile may be sent to client 120, along with a reference to the cached tile partially matched in step 504. Such a reference may include, for example, an identifier of a previously cached tile, or an index of the cached tile within the tile cache; however, any suitable identifier of the tile image previously received and recorded by client 120 may be used (e.g., a grid location of the tile within a aggregate image of cached tiles, etc.).

Client 120 may then reconstruct the complete new source tile from the new bitmap data supplied, and its own previously received copy of tile cache 113.

In yet another optimization example, step 504 may be executed a second time, if a top-aligned, sub-tile match is not found within the sub-images of the source tile. This second run of step 504 may search for the largest bottom-aligned sub-image present. As with the previous optimization, any bottom-aligned sub-image of the source tile above a suitable size threshold that is discovered in tile cache 113 could be sent as a cache reference, along with the remaining un-matched source tile bitmap data. This optimization provides bandwidth savings at the cost of increased CPU 113 usage incurred by the additional tile cache searches.

In a further optimization, spatial translation of tiles in multiple directions, for example both horizontal and vertical, can be supported. Additional sets of sub-image references (e.g. covering the left & right aligned sub images of the cached tiles) are also inserted into the tile cache. When searching for a scrolled region, sub-image matches for all supported scroll directions are searched for. Crucially, if a match is found through a combination of two sub-images, the two sub images are then combined to make a new cached tile. This ensures that further multi-directional scrolling from the spatially translated position is supported. If this step is missed, if a horizontal scroll was followed by a vertical scroll, the vertical scrolled region would not be found in the tile cache.

Detecting scrolled and/or other spatially translated regions in tile cache 113 may result in a considerable bandwidth reduction for a polling capture-based recording application 111. By reducing the bandwidth used by recording application 111, application responsiveness and usability can be dramatically increased, thereby enhancing a variety of bandwidth restricted environments, such as, for example, Wide Area Networks, the Internet, and cellular networks. Various embodiments disclosed herein are completely portable, and do not rely on any operating-system dependent mechanisms to detect scrolling.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
   polling a first data packet sent to an output operable to render the first data packet into a human-perceptible form;
   determining, based at least in part on the polling, if at least one partition of a first plurality of partitions associated with the first data packet is at least similar to a combination of respective portions of at least two partitions of a second plurality of partitions associated with a stored data packet;
   communicating, to one or more clients, respective references to the at least two partitions of the second plurality of discrete partitions; and
   communicating, to the one or more clients, an offset of the at least two partitions of the second plurality of partitions relative to the at least one partition of the first plurality of partitions; and
   wherein each client is operable to reconstruct the polled data based at least in part on the communicated reference and offset.

2. The method of claim 1, wherein the determining further comprises determining if the at least one partition of the first plurality of partitions represents first spatial information that is at least similar to, but spatially translated from, second spatial information represented by the combination of the respective portions of the at least two partitions of the second plurality of partitions.

3. The method of claim 1, further comprising updating the second plurality of partitions to match the first plurality of partitions, at least in part, by interpreting a plurality of references identifying the combination of respective portions of at least two partitions of the second plurality of partitions.

4. The method of claim 1, wherein each reference is a hash table entry keyed on the checksum of the respective portions of the at least two partitions of the second plurality of partitions.

5. The method of claim 1, further comprising updating the stored data packet to match the first data packet, at least in part, by interpreting a plurality of references identifying the combination of respective portions of at least two partitions of the second plurality of partitions.

6. The method of claim 1, further comprising recording the first data packet within computer-readable media, at least in part, by receiving a plurality of references identifying the combination of respective portions of at least two partitions of the second plurality of partitions.

7. The method of claim 1, further comprising communicating, to the one or more clients, one or more references to the combination of respective portions of at least two partitions of the second plurality of partitions.

8. The method of claim 1, wherein the stored data packet had been previously stored within computer-readable media.

9. The method of claim 1, wherein data corresponding to the stored data packet had been previously sent to the output.

10. Logic encoded in tangible computer-readable media and when executed operable to:
poll a first data packet sent to an output operable to render the first data packet into a human-perceptible form;
determine, based at least in part on the polling, if at least one partition of a first plurality of partitions associated with the first data packet is at least similar to a combination of respective portions of at least two partitions of a second plurality of partitions associated with a stored data packet;
communicate, to one or more clients, respective references to the at least two partitions of the second plurality of discrete partitions; and
communicate, to the one or more clients, an offset of the at least two partitions of the second plurality of partitions relative to the at least one partition of the first plurality of partitions; and
wherein each client is operable to reconstruct the polled data based at least in part on the communicated reference and offset.

11. The logic of claim 10, wherein the logic when executed is further operable to:
determine if the at least one partition of the first plurality of partitions represents spatial information that is at least similar to, but spatially translated from, spatial information represented by the combination of the respective portions of the least two partitions of the second plurality of partitions.

12. The logic of claim 10, wherein the logic when executed is further operable to: update the second plurality of partitions to match the first plurality of partitions, at least in part, by interpreting a plurality of references identifying the combination of respective portions of at least two partitions of the second plurality of discrete partitions.

13. The logic of claim 10, wherein the logic when executed is further operable to: update the stored data packet to match the first data packet, at least in part, by interpreting a plurality of references identifying the combination of respective portions of at least two partitions of the second plurality of discrete partitions.

14. The logic of claim 10, wherein the logic when executed is further operable to: record the first data packet within computer-readable media, at least in part, by receiving a plurality of references identifying the combination of respective portions of at least two partitions of the second plurality of discrete partitions.

15. The logic of claim 10, wherein the logic when executed is further operable to: communicate, to the one or more clients, one or more references to the combination of respective portions of at least two partitions of the second plurality of partitions.

16. A system, comprising:
an output operable to:
receive a first data packet;
receive a second data packet; and
render, in order of receipt, the first and second data packets in human-perceptible form; and
a computer-readable cache operable to:
store a plurality of partitions associated with the first data packet; and
update at least one partition of the stored plurality of partitions to match a corresponding partition associated with the second data packet by referencing respective portions of at least two other partitions of the stored plurality of partitions; and
at least one interface operable to:
communicated, to one or more clients, a reference to the respective portions of the at least two other partitions of the stored plurality of partitions; and
communicated, to the one or more clients, an offset of the respective partitions of the at least two other partitions relative to the at least one partition of the stored plurality of partitions; and
wherein each client is operable to reconstruct the second data packet based in part on the communicated reference and offset.

17. The system of claim 16, further comprising: an interface operable to communicate the updated at least one partition of the stored plurality of partitions to one or more clients.

18. A system, comprising:
means for polling a first data packet sent to an output operable to render the first data packet into a human-perceptible form;
means for determining, based at least in part on the polling, if at least one partition of a first plurality of partitions associated with the first data packet is at least similar to a combination of respective portions of at least two partitions of a second plurality of partitions associated with a stored data packet;
means for communicating, to one or more clients, respective references to the at least two partitions of the second plurality of discrete partitions; and
means for communicating, to the one or more clients, an offset of the at least two partitions of the second plurality of partitions relative to the at least one partition of the first plurality of partitions; and
wherein each client is operable to reconstruct the polled data based at least in part on the communicated reference and offset.

* * * * *